United States Patent Office 3,425,943
Patented Feb. 4, 1969

---

3,425,943
NOVEL QUATERNARY SEMICONDUCTING COMPOSITIONS OF MATTER
George Augustus Castellion, Stamford, Conn., assignor to American Cyanamid Company, Stamford, Conn., a corporation of Maine
No Drawing. Filed May 26, 1966, Ser. No. 553,008
U.S. Cl. 252—62.3                      7 Claims
Int. Cl. C04b 35/00

The present invention relates to novel quaternary semiconducting compositions of matter. More particularly, it relates to the fusion of the elements: manganese or magnesium with zinc, cadmium and arsenic to form crystals which are of a single phase and which find utility in solid state conductor devices. Still more particularly, the invention is concerned with novel quaternary semiconducting single phase compounds of the formula:

$$M_{3-(m+n)}Zn_mCd_mAs_2$$

wherein M is either magnesium or manganese and $m$ and $n$ are each a value ranging from about 0.25 to about 2.5, and provided that the sum of $m$ and $n$ does not exceed about 2.75.

It is well known that inorganic semiconducting compounds can be advantageously employed in solid state semiconductor devices which include, amongst others, transistors, rectifiers, diodes, photocells, thermocouples and thermoelectric generators. However, many of the known compounds are not of a single phase. The latter property is of critical moment, for otherwise the presence of a plurality of phases results in inefficient thermoelectric properties. Unfortunately, in the preparation of inorganic semiconducting compounds, it is not predictable what the effect of an additional component may have on the overall crystal structure. Usually, alloys result in a plurality of phases with attendant inefficient themoelectric properties as previously mentioned. It would, therefore, be highly desirable to provide the art with inorganic semiconducting compounds which are of a single phase and which may be prepared in a straightforward and economical manner.

It has been unexpectedly found that quaternary semiconducting materials of the formula:

$$M_{3-(m+n)}Zn_mCd_nAs_2$$

where M is either magnesium or manganese, and $m$ and $n$ are each a value ranging from about 0.25 to about 2.5, provided that the sum of $m$ and $n$ does not exceed about 2.75, can be readily synthesized to produce crystals possessing a single phase. As such, the thermoelectric properties of the compounds of the present invention are good.

In general, the compounds of the present invention can be prepared by comminuting each of the elements into particulate form. For best operation, the diameter of each of the elements should not exceed about ten millimeters. Thereafter, the elements are mixed into required stoichiometric amounts, loaded into a crucible which is evacuated sealed and then subjected to elevated temperatures. This is usually accomplished by placing the crucible containing the mixed elements into a furnace and heating the latter to a temperature above the melting point of the elements or composition of matter to be prepared. In general, a temperature of from about 700° C. to about 1100° C. will be required to accomplish this end. Depending on the temperature employed, the time required to fuse the elements commencing at room temperature ranges from about 30 minutes to 3 hours. For most preparations, a time of about 1 hour appears to be the upper limit.

The temperatures employed are sufficient as to liquefy the elements present. In this state, the elements are intimately mixed by rocking the crucible-containing furnace. Uniformity of product is thereby achieved. Thereafter, the contents in the crucible are cooled at rates ranging from approximately 2° C. to 20° C. per hour and this rate of cooling is continued until a temperature of about 400° C. is reached. At this point, the cooling rate is increased to from 80° C. to 100° C. per hour.

The properties of each of the compounds prepared are determined in the following manner:

The electrical resistance is measured at room temperature by passing a current through a specimen and measuring the voltage drop between two probes pressed on the surface parallel to the axis of the specimen.

The Seebeck coefficient is measured at room temperature by placing one end of a cylindrical specimen on a copper block cooled by an ice-water mixture. A second block heated to several degrees above room temperature is pressed against the opposite end of the specimen. The potential difference [ΔV] and the temperature difference [ΔT] between the hot end and the cold end of the specimen is measured and the Seebeck coefficient (S) is calculated as follows utilizing the formula:

$$S = \lim_{\Delta T \to 0} \frac{\Delta V}{\Delta T}$$

In order to further illustrate the present invention, the following examples are presented merely by way of illustration. These are not to be taken as limitative of the invention.

EXAMPLE 1

In this example, there are admixed stoichiometric quantities of magnesium, zinc, cadmium and arsenic which correspond to the compound:

$$Mg_{0.25}Zn_{0.25}Cd_{2.5}As_2$$

Accordingly, a mixture of 0.2011 gram of magnesium, 0.5408 gram of zinc and 9.2993 grams of cadmium is introduced into a crucible of quartz tubing which is evacuated to a pressure of less than about $1 \times 10^{-3}$ mm. Hg. Thereafter, 4.9587 grams of arsenic under a nitrogen atmosphere are introduced into a side arm of the crucible. Again, the crucible is evacuated to a pressure of less than $1 \times 10^{-3}$ mm. Hg.

After sealing the crucible, it is placed in a holder in a resistance furnace. The furnace is equipped with a rocking device which gently rocks the latter during reaction. The temperature of the furnace is raised to 1000° C. and after achieving that temperature it is held for three hours during which time the rocking of the furnace occurs. Thereafter, rocking is terminated and the temperature of the furnace is lowered at a steady rate from approximately 1000° C. to 400° C. over a period of 24 hours. Thereafter, the furnace is cooled by shutting the power off completely and upon reaching room temperature the product in the crucible is removed therefrom and examined both microscopically and by means of X-rays.

Resultant product exhibited unequivocally a single phase. It also possesses a resistance of $3.6 \times 10^{-4}$ ohm-centimeter and a Seebeck coefficient of 49 microvolts/° C. The compound also possesses a new X-ray diffraction pattern which has no counterpart in the American Society for Testing Materials file of known X-ray diffraction data (1965). This X-ray diffraction pattern is set forth in Table I below, wherein I is defined as the obseved intensity values and $d$ is defined as the interplanar spacings in angstrom units (A.).

TABLE I

| I: | d |
|---|---|
| 2 | 11.62 |
| 1— | 9.82 |
| 1— | 8.75 |

TABLE I.—Continued

| I: | d |
|---|---|
| 4 | 7.13 |
| 1— | 6.15 |
| 1— | 5.47 |
| 3 | 4.15 |
| 3 | 3.75 |
| 7 | 3.62 |
| 3 | 3.35 |
| 4 | 3.13 |
| 5 | 3.03 |
| 4 | 2.87 |
| 4 | 2.67 |
| 1 | 2.45 |
| 3 | 2.41 |
| 10 | 2.22 |
| 7 | 1.89 |
| 1 | 1.84 |
| 1 | 1.82 |
| 2 | 1.80 |
| 2 | 1.76 |
| 3 | 1.71 |
| 4 | 1.66 |
| 4 | 1.64 |
| 4 | 1.60 |
| 5 | 1.57 |
| 1 | 1.54 |
| 4 | 1.45 |
| 1 | 1.40 |
| 1 | 1.38 |

EXAMPLE 2

Preparation of the compound $Mg_{0.5}ZnCd_{1.5}As_2$

Example 1 is repeated in every detail except that the stoichiometric quantity is modified by providing 0.4604 gram of magnesium, 2.4764 grams of zinc, 6.3869 grams of cadmium and 5.6763 grams of arsenic. There is obtained a single phase semiconducting material which possesses a resistance of 1.3 ohm-centimeter and a Seebeck coefficient of 324 microvolts/° C.

An X-ray diffraction powder pattern of the resultant product exhibits a new single phase. The X-ray diffraction pattern is tabulated in Table II below wherein I and d are as defined in Table I above.

TABLE II

| I: | d |
|---|---|
| 1 | 11.8 |
| 2 | 7.13 |
| 1— | 5.01 |
| 2 | 4.09 |
| 1— | 3.93 |
| 2 | 3.70 |
| 7 | 3.54 |
| 2 | 3.29 |
| 1 | 3.08 |
| 4 | 2.99 |
| 3 | 2.82 |
| 3 | 2.63 |
| 1— | 2.41 |
| 2 | 2.38 |
| 10 | 2.18 |
| 1— | 1.93 |
| 5 | 1.86 |
| 1— | 1.78 |
| 1 | 1.76 |
| 1 | 1.73 |
| 1 | 1.68 |
| 2 | 1.63 |
| 3 | 1.60 |
| 2 | 1.57 |
| 4 | 1.55 |
| 1 | 1.424 |
| 2 | 1.416 |
| 1— | 1.374 |
| 1— | 1.333 |

TABLE II.—Continued

| I: | d |
|---|---|
| 1 | 1.307 |
| 6 | 1.260 |
| 4 | 1.191 |
| 3 | 1.090 |
| 2 | 1.067 |
| 3 | 1.044 |
| 2 | .976 |
| 1 | .902 |
| 1 | .865 |
| 2 | .825 |
| 2 | .804 |
| 1 | .779 |

EXAMPLE 3

Preparation of the compound $Mn_{0.5}ZnCd_{1.5}As_2$

Repeating the procedure of Example 2 in every detail except that 1.3358 grams of manganese, 3.1789 grams of zinc, 8.1988 grams of cadmium and 7.2865 grams of arsenic are employed to form the compound:

$$Mn_{0.5}ZnCd_{1.5}As_2$$

There is obtained a single phase semiconducting material which possesses a resistance of $1.5 \times 10^{-2}$ ohm-centimeter and a Seebeck coefficient of 163 microvolt/° C. The new X-ray diffraction pattern is set forth in Table III below wherein I and d are defined as in Table I above.

TABLE III

| I: | d |
|---|---|
| 2 | 7.08 |
| 1 | 5.94 |
| 1 | 4.98 |
| 3 | 4.07 |
| 1 | 3.69 |
| 7 | 3.54 |
| 2 | 3.28 |
| 3 | 3.06 |
| 5 | 2.97 |
| 3 | 2.81 |
| 3 | 2.60 |
| 1 | 2.40 |
| 2 | 2.36 |
| 10 | 2.17 |
| 7 | 1.85 |
| 1 | 1.74 |
| 1 | 1.72 |
| 1 | 1.67 |
| 1 | 1.63 |
| 2 | 1.60 |
| 1 | 1.56 |
| 6 | 1.54 |
| 4 | 1.41 |
| 1 | 1.30 |
| 8 | 1.25 |

EXAMPLE 4

Preparation of the compound $MnZnCdAs_2$

The procedure of Example 1 is repeated in every detail except that stoichiometric amounts of manganese, zinc, cadmium and arsenic equivalent to 2.8723, 3.4176, 5.8764, and 7.8337 grams, respectively, are employed to form the compound: $MnZnCdAs_2$. Resultant product is shown to have a resistance of 480 ohm-centimeter and a Seebeck coefficient of 155 microvolts/° C. Upon X-ray analysis, the crystalline product is unequivocally single phase. Further, an X-ray diffraction pattern of the resultant product exhibits the presence of a new phase, which pattern is recorded in Table IV below and where I and d are defined in Table I above.

TABLE IV

| I: | d |
|---|---|
| 1 | 7.13 |
| 9 | 3.50 |

TABLE IV.—Continued

| I: | d |
|---|---|
| 1 | 3.12 |
| 3 | 3.04 |
| 2 | 2.41 |
| 10 | 2.15 |
| 1 | 2.05 |
| 1 | 1.86 |
| 8 | 1.83 |
| 7 | 1.52 |
| 6 | 1.40 |
| 8 | 1.24 |
| 5 | 1.17 |
| 5 | 1.08 |
| 5 | 1.03 |
| 5 | .961 |

I claim:

1. A semiconducting, single phase composition of matter having the formula:

$$M_{3-(m+n)}Zn_mCd_nAs_2$$

wherein M is an element selected from the group consisting of magnesium and manganese and $m$ and $n$ are each a value ranging from about 0.25 to about 2.5 in which the sum of $m$ and $n$ does not exceed about 2.75.

2. A semiconducting composition of matter according to claim 1 wherein M is magnesium.

3. A semiconducting composition of matter according to claim 1 wherein M is manganese.

4. A semiconducting composition of matter according to claim 1 wherein M is magnesium, $m$ is 1 and $n$ is 1.5.

5. A semiconducting composition of matter according to claim 1 wherein M is magnesium, $m$ is 0.25 and $n$ is 2.5.

6. A semiconducting composition of matter according to claim 1 wherein M is manganese, $m$ is 1 and $n$ is 1.5.

7. A semiconducting composition of matter according to claim 1 wherein M is manganese, $m$ is 1 and $n$ is 1.

References Cited

UNITED STATES PATENTS 3,211,517   10/1965   Castellion _____ 252—62.3 X

TOBIAS E. LEVOW, *Primary Examiner.*

J. COOPER, *Assistant Examiner.*

U.S. Cl. X.R.

23—315; 136—240; 252—500, 501, 518, 521